US010408090B2

United States Patent
Propheter-Hinckley

(10) Patent No.: US 10,408,090 B2
(45) Date of Patent: Sep. 10, 2019

(54) GAS TURBINE ENGINE ARTICLE WITH PANEL RETAINED BY PRELOADED COMPLIANT MEMBER

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 372 days.

(21) Appl. No.: 15/354,373

(22) Filed: Nov. 17, 2016

(65) Prior Publication Data
US 2018/0135464 A1 May 17, 2018

(51) Int. Cl.
*F01D 25/28* (2006.01)
*F01D 5/14* (2006.01)
(Continued)

(52) U.S. Cl.
CPC ............ *F01D 25/28* (2013.01); *F01D 5/147* (2013.01); *F01D 5/188* (2013.01); *F01D 5/282* (2013.01); *F01D 5/284* (2013.01); *F01D 9/02* (2013.01); *F01D 11/08* (2013.01); *F02C 3/04* (2013.01); *F04D 29/083* (2013.01); *F04D 29/542* (2013.01); *F04D 29/644* (2013.01); *F05D 2220/32* (2013.01); *F05D 2230/60* (2013.01); *F05D 2240/12* (2013.01); *F05D 2240/35* (2013.01); *F05D 2260/30* (2013.01); *F05D 2260/38* (2013.01); *F05D 2260/52* (2013.01); *F05D 2300/20* (2013.01); *F05D 2300/6033* (2013.01); *Y02T 50/672* (2013.01); *Y02T 50/676* (2013.01)

(58) Field of Classification Search
CPC . F01D 25/28; F01D 9/02; F01D 11/02; F01D 5/12; F01D 5/14; F01D 5/147; F01D 5/18; F01D 5/188; F04D 28/542
See application file for complete search history.

(56) References Cited

U.S. PATENT DOCUMENTS 3,215,511 A    11/1965  Chisholm
3,369,792 A *  2/1968  Kraimer .................. F01D 5/188
                                                            415/115
(Continued)

FOREIGN PATENT DOCUMENTS

EP    0764764    3/1997
EP    1764481    3/2007
(Continued)

OTHER PUBLICATIONS

European Search Report for European Patent Application No. 17202364 completed Mar. 12, 2018.
(Continued)

*Primary Examiner* — Jacob M Amick
(74) *Attorney, Agent, or Firm* — Carlson, Gaskey & Olds, P.C.

(57) ABSTRACT

An airfoil includes an airfoil structure that has an interior cavity, a preloaded compliant member in the interior cavity, and a panel that defines a portion of an airfoil profile. The preloaded compliant member compliantly retains the panel in a seated position on the airfoil structure.

21 Claims, 6 Drawing Sheets

(51) Int. Cl.
*F01D 5/18* (2006.01)
*F02C 3/04* (2006.01)
*F01D 9/02* (2006.01)
*F01D 11/08* (2006.01)
*F04D 29/08* (2006.01)
*F04D 29/54* (2006.01)
*F04D 29/64* (2006.01)
*F01D 5/28* (2006.01)

(56) References Cited

U.S. PATENT DOCUMENTS

| | | | |
|---|---|---|---|
| 4,137,008 A | 1/1979 | Grant et al. | |
| 4,247,259 A | 1/1981 | Saboe et al. | |
| 4,396,349 A | 8/1983 | Hueber | |
| 4,519,745 A | 5/1985 | Rosman et al. | |
| 4,914,794 A | 4/1990 | Strangman | |
| 5,358,379 A | 10/1994 | Pepperman et al. | |
| 5,407,321 A | 4/1995 | Rimkunas et al. | |
| 5,538,380 A | 7/1996 | Norton et al. | |
| 5,681,616 A | 10/1997 | Gupta et al. | |
| 5,705,231 A | 1/1998 | Nissley et al. | |
| 5,827,045 A * | 10/1998 | Beeck | F01D 5/284 416/96 A |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,402,466 B1 | 6/2002 | Burdgick et al. | |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 | 8/2012 | Propheter-Hinckley et al. | |
| 8,366,392 B1 | 2/2013 | Laing | |
| 8,480,366 B2 | 7/2013 | Malecki et al. | |
| 8,506,243 B2 | 8/2013 | Strock et al. | |
| 8,556,578 B1 | 10/2013 | Memmen et al. | |
| 8,607,577 B2 | 12/2013 | Sanchez et al. | |
| 8,821,124 B2 | 9/2014 | Viens et al. | |
| 2001/0033793 A1 * | 10/2001 | Lewis | F01D 5/147 416/232 |
| 2008/0159850 A1 | 7/2008 | Tholen et al. | |
| 2010/0068034 A1 | 3/2010 | Schiavo et al. | |
| 2010/0136258 A1 | 6/2010 | Stock et al. | |
| 2016/0090851 A1 | 3/2016 | Carr et al. | |

FOREIGN PATENT DOCUMENTS

| | | |
|---|---|---|
| EP | 2105579 | 9/2009 |
| EP | 2853688 | 4/2015 |
| GB | 148763 | 9/1977 |
| GB | 2272453 | 5/1994 |
| JP | 61066802 | 4/1986 |
| JP | 05321602 | 12/1993 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

GAS TURBINE ENGINE ARTICLE WITH PANEL RETAINED BY PRELOADED COMPLIANT MEMBER

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil structure that has an interior cavity, a preloaded compliant member in the interior cavity, and a panel that defines a portion of an airfoil profile. The preloaded compliant member compliantly retains the panel in a seated position on the airfoil structure.

In a further embodiment of any of the foregoing embodiments, the panel includes a perimeter bearing surface and the airfoil structure includes a bearing surface, and in the seated position the perimeter bearing surface and the bearing surface of the airfoil structure are in contact in a bearing interface.

In a further embodiment of any of the foregoing embodiments, the bearing interface is obliquely sloped with respect to a line that intersects the bearing interface and that is orthogonal to an exterior surface of the airfoil structure adjacent the bearing interface.

In a further embodiment of any of the foregoing embodiments, the preloaded compliant member includes a mechanical spring.

In a further embodiment of any of the foregoing embodiments, the mechanical spring is a rib seal that divides the interior cavity.

In a further embodiment of any of the foregoing embodiments, the airfoil structure includes a first slot, the panel includes a second slot, and the first slot and the second slot retain the rib seal.

In a further embodiment of any of the foregoing embodiments, the preloaded compliant member includes a baffle.

A further embodiment of any of the foregoing embodiments includes spacers between the baffle and the panel, the spacers separating the baffle from the panel such that there is a passage there between.

In a further embodiment of any of the foregoing embodiments, the preloaded compliant member includes a mechanical spring and a baffle that is disposed in the interior cavity.

In a further embodiment of any of the foregoing embodiments, the panel includes ceramic.

In a further embodiment of any of the foregoing embodiments, the panel bounds a side of the interior cavity.

In a further embodiment of any of the foregoing embodiments, the airfoil structure defines a different portion of the airfoil profile.

In a further embodiment of any of the foregoing embodiments, the panel includes a perimeter bearing surface. The airfoil structure includes a bearing surface, and in the seated position the perimeter bearing surface and the bearing surface of the airfoil structure are in contact in a bearing interface. The bearing interface is obliquely sloped with respect to a line that intersects the bearing interface and that is orthogonal to an exterior surface of the airfoil structure adjacent the bearing interface, and the preloaded compliant member includes at least one of a mechanical spring or a baffle.

A gas turbine engine according to an example of the present disclosure include a compressor section, a combustor in fluid communication with the compressor section, and a turbine section in fluid communication with the combustor. One of the turbine section or the compressor section includes an airfoil that has an airfoil structure that has an interior cavity, a preloaded compliant member in the interior cavity, and a panel that defines a portion of an airfoil profile. The preloaded compliant member compliantly retains the panel in a seated position on the airfoil structure.

In a further embodiment of any of the foregoing embodiments, the preloaded compliant member includes at least one of a mechanical spring or a baffle.

In a further embodiment of any of the foregoing embodiments, the panel includes a perimeter bearing surface. The airfoil structure includes a bearing surface, and in the seated position the perimeter bearing surface and the bearing surface of the airfoil structure are in contact in a bearing interface, and the bearing interface is obliquely sloped with respect to a line that intersects the bearing interface and that is orthogonal to an exterior surface of the airfoil structure adjacent the bearing interface.

A method of assembling an airfoil according to an example of the present disclosure includes placing a panel into a seated position in an interior cavity of an airfoil structure, placing a compliant member in the interior cavity and preloading the compliant member such that the preloaded compliant member compliantly retains the panel in the seated position.

In a further embodiment of any of the foregoing embodiments, the preloading includes deflecting the compliant member.

In a further embodiment of any of the foregoing embodiments, the panel includes a perimeter bearing surface and the airfoil structure includes a bearing surface, and placing the panel into the seated position includes moving the perimeter bearing surface into contact in a bearing interface with the bearing surface of the airfoil structure.

In a further embodiment of any of the foregoing embodiments, the bearing interface is obliquely sloped with respect to a line that intersects the bearing interface and that is orthogonal to an exterior surface of the airfoil structure adjacent the bearing interface.

A gas turbine engine article according to an example of the present disclosure includes a support structure having an interior cavity and a bearing surface, a preloaded compliant member in the interior cavity, and a panel that has a core gas path side and a perimeter bearing surface. In a seated position of the panel on the support structure, the preloaded compliant member compliantly retains the perimeter bearing surface of the panel in contact against the bearing surface of the support structure in a bearing interface.

In a further embodiment of any of the foregoing embodiments, the bearing interface is obliquely sloped with respect to a line that intersects the bearing interface and that is orthogonal to an exterior surface of the support structure adjacent the bearing interface.

In a further embodiment of any of the foregoing embodiments, the preloaded compliant member includes at least one of a rib seal that divides the interior cavity or a baffle.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
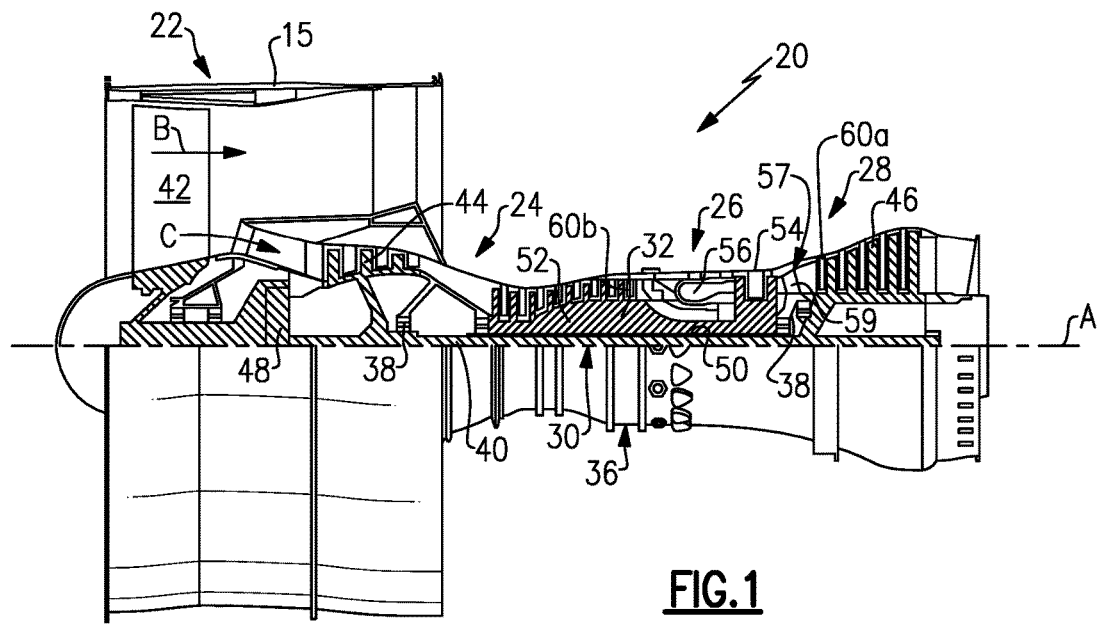
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
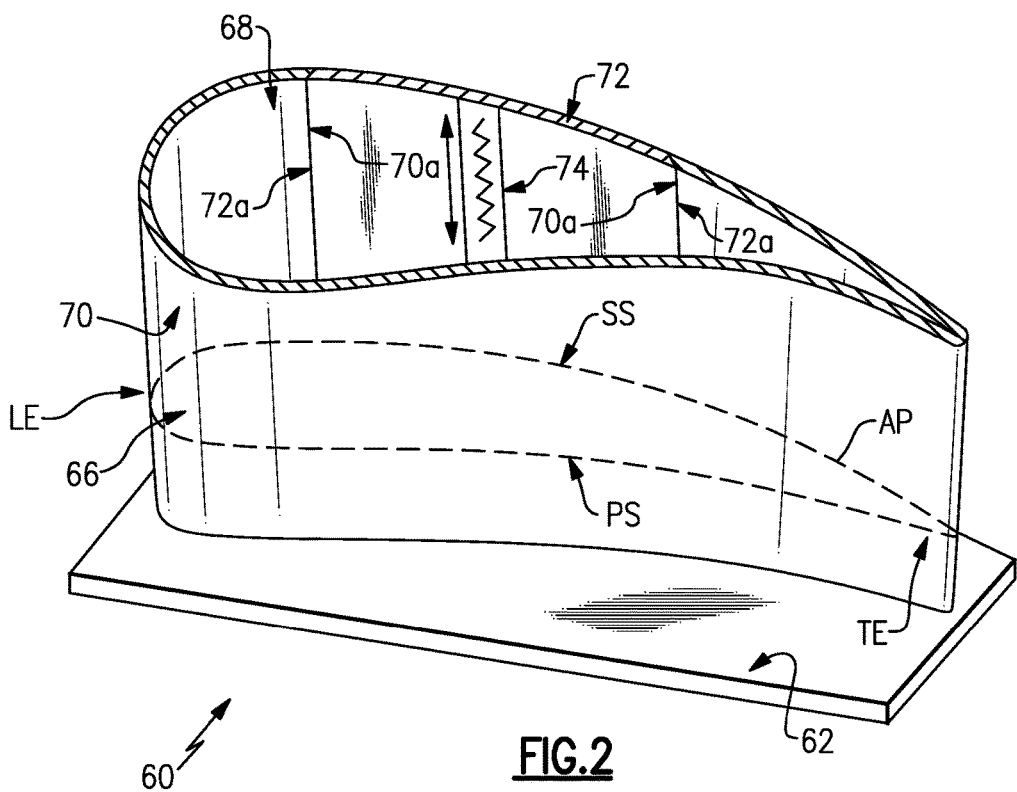
FIG. 2 illustrates an example article of the engine of FIG. 1. In the example shown, the article is an airfoil.

FIG. 2 illustrates an example gas turbine engine article 60 used in the engine 20. In the illustrated example the article 60 is an airfoil, such as a turbine vane, as represented at 60a in FIG. 1, or a compressor vane, as represented at 60b in FIG. 1. In this example, the article 60 is a static vane. As will be appreciated, although the examples herein are described in the context of an airfoil, this disclosure is not limited to airfoils, and the examples may also be applicable to outer air seals or other turbine engine components that are exposed to high temperatures.

In this example, the article 60 includes an end section 62 and an airfoil section 66 that spans in a longitudinal direction from the end section 62. The longitudinal direction is also the radial direction in the engine 20 with regard to the engine central axis A. The airfoil section 66 defines an airfoil profile (AP), which is the peripheral shape of the airfoil section 66 when viewed in a radial direction. For example, the airfoil profile (AP) has a wing-like shape that provides a reaction force via Bernoulli's principle with regard to flow over the airfoil section 66. The full or complete airfoil profile (AP) generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane. As will be appreciated, the article 60 may include another end section opposite the end section 62, with the airfoil section 66 spanning between the end sections.

The airfoil section 66 is hollow and includes an interior cavity 68. The interior cavity 68 may be provided with cooling bleed air from the compressor section 24 of the engine 20, to cool the article 60.

The airfoil section 66 includes at least a portion of a support structure 70 and a panel 72 that is attached with the support structure 70. In the example of an airfoil, the support structure 70 is an airfoil structure (hereafter "airfoil structure 70) that may define a portion of the airfoil profile (AP). In this example, the airfoil structure 70 defines the leading end (LE), the pressure side (PS), and the trailing end (TE) of the airfoil profile (AP) and the panel 72 defines the suction side (SS), or at least a portion thereof. For a blade outer air seal or other turbine engine article, the support structure 70 will have a different geometry that mechanically supports the panel 72. As will be appreciated, although the illustrated example includes only one panel 72, the airfoil section 66 could include additional panels with features described herein. Additionally or alternatively, one or more of the panels could define one or more of the leading end (LE), the pressure side (PS), the trailing end (TE), or portions thereof.

The panel 72 is in a seated position on the airfoil structure 70. For example, in the seated position the exterior surface of the panel 72 is flush or substantially flush with the exterior surface of the airfoil structure 70 to form a smooth airfoil profile (AP). In another example, the panel 72 includes perimeter edges 72a that fit with or engage edges 70a of the airfoil structure 70 when the panel 72 is in the seated position.

The article 60 includes at least one preloaded compliant member 74 in the interior cavity 68. The preloaded compliant member 74 compliantly retains the panel 72 in the seated position on the airfoil structure 70. For instance, when at rest with no internal pressure in the interior cavity 68, the panel 72 would otherwise readily move, or could readily be moved, from the seated position in the absence of the preloaded compliant member 74. As will be appreciated, more than one preloaded compliant member 74 may be used to compliantly retain the panel 72 in the seated position.

The preloaded compliant member 74 is "preloaded" in that a load applied displaces it from its at-rest position (position without any load applied). As an example, the load applied is from the force exerted on the preloaded compliant member 74 due to its position sandwiched between the airfoil structure 70 and the panel 72. For instance, the airfoil structure 70 and the panel 72 compress the preloaded compliant member 74. In this regard, the compliant response of the preloaded compliant member 74 to the applied load is to exert an opposite force. This opposite force provides a positive force on the panel 72 against the airfoil structure 70 to keep the panel 72 in the seated position.

As an example, the compliance that makes the member 74 "compliant" is the inverse of the stiffness of the preloaded compliant member 74. Stiffness (or inversely the compliance) may also be related to the elasticity, or elastic modulus, of the material used for the preloaded compliant member 74. However, the elastic modulus is not the same as the stiffness. Elastic modulus is a property of the material, and stiffness is a property of the component (the preloaded compliant member 74). Thus, the modulus is an intensive property of the material and the stiffness is an extensive property that relates to the material and shape of the component. As will be appreciated, there are known ways of expressing stiffness, and thus compliance. Although not limited, Equations I and II below illustrate several examples of stiffness (and thus inversely compliance).

$$k=F/d \qquad \text{Equation I}$$

where "k" is stiffness, "F" is force, and "d" is displacement.

$$k=(A \times E)/L \qquad \text{Equation II}$$

where "k" is stiffness, "A" is area, "E" is elastic modulus of the material, and "L" is length of the element.

The materials of which the article 60 is formed of may be selected to enhance the performance. For example, the airfoil structure 70 and the panel 72 may be formed of a ceramic or of a metal or a combination thereof. For instance, the panel 72 is ceramic and the airfoil structure 70 is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof. The preloaded compliant member 74 may also be formed of alloys, such as but not limited to, nickel alloys, cobalt alloys, a nickel alloy coated with cobalt or cobalt alloy, or non-nickel alloys that do not substantially react with ceramic.

If enhanced thermal or environmental resistance is desired, the airfoil structure 70 and/or the panel 72 may be coated with a thermal and/or environmental barrier ceramic coating, including but not limited to segmented coatings (discussed in further detail below with regard to FIGS. 6 and 7). As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

When the article 60 heats up during engine operation, the preloaded compliant member 74 also heat up. However due to differences in the coefficients of thermal expansion between the airfoil structure 70 and the preloaded compliant member 74, the preloaded compliant member 74 will thermally expand at a greater rate than the airfoil structure 70 and thereby maintain the positive force on the panel 72.

Figure 3A:
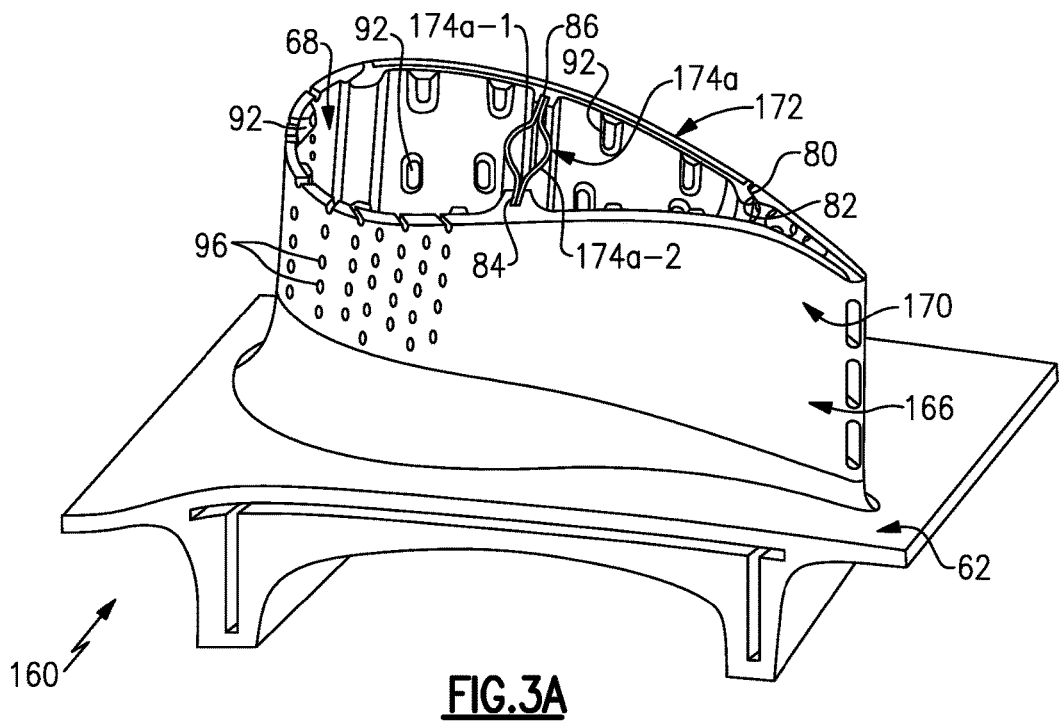
FIG. 3A illustrates another example article.
Figure 3B:
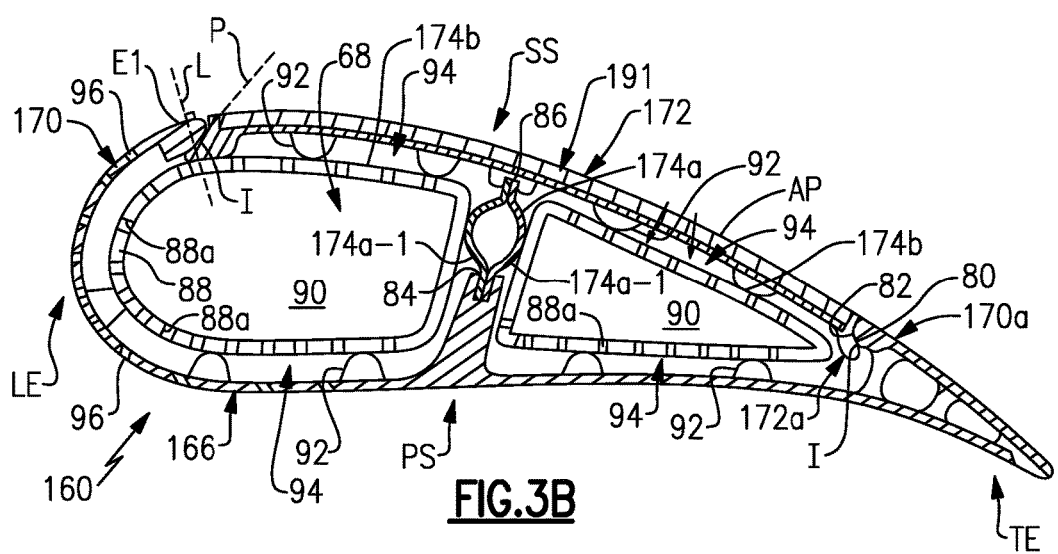
FIG. 3B illustrates a sectioned view of the article of FIG. 3A.
Figure 4:
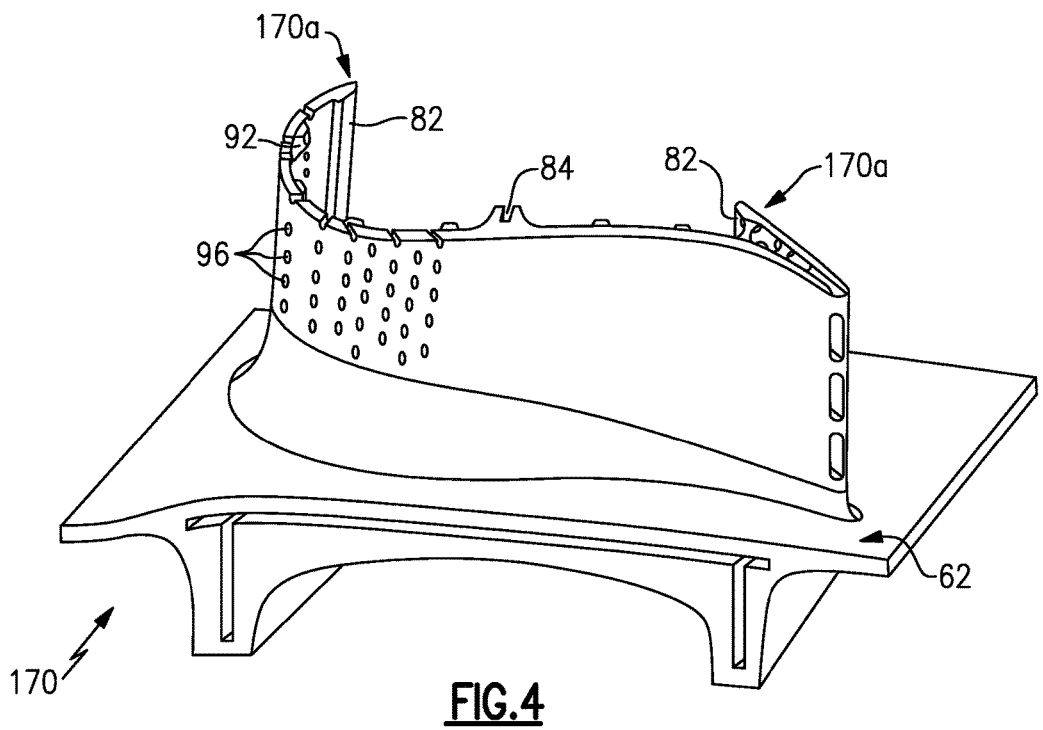
FIG. 4 illustrates an isolated view of an airfoil structure of the airfoil of FIG. 3A.

FIG. 3A illustrates another example of selected portions of an article 160, and FIG. 3B illustrates a sectioned view of the article 160 (but without baffles) of FIG. 3A. In this disclosure, like reference numerals designate like elements where appropriate and reference numerals with the addition of one-hundred or multiples thereof designate modified elements that are understood to incorporate the same features and benefits of the corresponding elements. In this example, the airfoil section 166 includes the airfoil structure 170 and the panel 172. The airfoil structure 170 is also shown in an isolated view in FIG. 4, without the panel 172.

The perimeter edges 172a of the panel 172 include a perimeter bearing surface 80 and the edges 170a of the airfoil structure 170 include corresponding bearing surfaces 82.

In the seated position, the perimeter bearing surface 80 contacts the bearing surface 82 in a bearing interface (I). The bearing surfaces 80/82 are sloped such that the panel 172 self-centers on the airfoil structure 170. As an example, the bearing interface (I) is obliquely sloped, as represented at plane P, with respect to a line (L) that intersects the bearing interface (I) and that is orthogonal to an exterior surface (E1) of the airfoil structure 170 adjacent the bearing interface (I).

In the illustrated example, the article 160 includes several different types of preloaded compliant members, represented at 174a and 174b. The preloaded compliant members 174a/174b compliantly retain the panel 172 in the seated position. As will be appreciated, although both types of preloaded compliant members 174a/174b are shown in this example, further examples may include only the type of preloaded compliant member 174a or only the type of preloaded compliant member 174b. Further, the article 160 may include additional panels 172, or the panel 172 may be divided into two or more panel pieces that are each held in a seated position by one or more preloaded compliant members 174a/174b.

In this example, the preloaded compliant member 174a is a mechanical spring. As shown, the mechanical spring is a leaf spring that includes two opposed leaves 174a-1 and 174a-2. For instance, the leaves 174a-1/174a-2 are pieces of curved or bent sheet metal that may be bonded together at the ends. Alternatively, the leaf spring may be a single piece of sheet metal that is curved or bent, or a flat piece of sheet metal.

It is to be understood that other types of mechanical springs could alternatively be used. In this example though, the leaf spring serves the as the preloaded compliant member to compliantly retain the panel 172 and also as a rib seal that divides the interior cavity 68. As an example, the airfoil structure 170 includes a first slot 84 and the panel 172 includes a second slot 86. The slots 84/86 may be in ribs that protrude from, respectively, the airfoil structure 170 and the panel 172. The rib seal (preloaded compliant member 174a) is retained by the slots 84/86 such that the rib seal cannot freely move laterally in the interior cavity 68. Moreover, the rib seal may span the entire length, or substantially the entire length, of the interior cavity 68 such that the interior cavity 68 is divided into two isolated sub-cavities. For enhanced sealing, a flat piece of sheet metal may be used as the preloaded compliant member 174a. The flat piece of sheet metal serves as a feather seal and may conform to the sides of the slots 84/86 due to a pressure differential across the sub-cavities. Of course, if more than one rib seal were used, the interior cavity 68 could be divided into additional sub-cavities.

Similar to the article 60, the airfoil structure 170 and the panel 172 compress the preloaded compliant member 174a. In this regard, the compliant response of the preloaded compliant member 174a to the applied load is to exert an opposite force. This opposite force provides a positive force on the panel 172, which is conveyed through the perimeter bearing surface 80 against the bearing surface 82 of the airfoil structure 170 to keep the panel 172 in the seated position.

The preloaded compliant members 174b (two shown) are baffles that are disposed in the interior cavity 68. For example the baffles include baffle walls 88. In this example, the baffle walls 88 circumscribe an interior baffle cavity 90.

The baffle walls 88 may also include cooling holes 88*a*, for impingement cooling of the airfoil structure 170 and panel 172.

Each baffle (preloaded compliant members 174*b*) is seated in the airfoil section 166 against spacers 92. As examples, the spacers 92 may be protrusions that are integrally formed with the airfoil structure 170, protrusions that are integrally formed with the panel 172, elements that are bonded to the airfoil structure 170, elements that are bonded to the panel 172, elements that are separate from the airfoil structure 170 and panel 172, or combinations thereof. The spacers 92 separate the baffles from the interior sides of the airfoil structure 170, the panel 172, or both such that there is a passage 94 there between. For instance, cooling bleed air is fed into the baffle cavities 90. The baffles discharge the bleed air through the cooling holes 88*a* to provide impingement flow onto the interior sides of the airfoil structure 170 and panel 172. The airfoil structure 170, the panel 172, or both may include outlet holes 96 to discharge the bleed air from the passage 94 into the core gas path.

Similar to the preloaded compliant member 174*a*, the airfoil structure 170 and the panel 172 compress the baffles (preloaded compliant members 174*b*). In this regard, compliant response of the preloaded compliant members 174*b* to the applied load is to exert an opposite force. This opposite force provides a positive force through the spacers 92 on the panel 172, which is conveyed through the perimeter bearing surface 80 against the bearing surface 82 of the airfoil structure 170 to keep the panel 172 in the seated position.

The article 160 may be assembled by placing the panel 172 into the seated position in the interior cavity 68 of the airfoil structure 170, placing the compliant member (174*a*, 174*b*) in the interior cavity 68, and preloading the compliant member (174*a*, 174*b*) such that the preloaded compliant member (174*a*, 174*b*) compliantly retains the panel 172 in the seated position.

Figure 5:
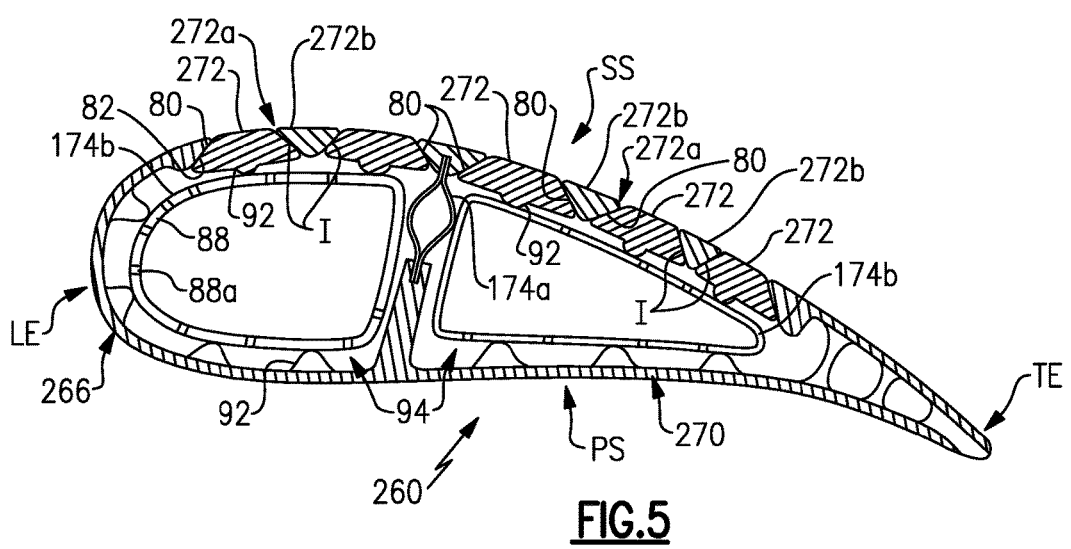
FIG. 5 illustrates another example article with a plurality of panels.

FIG. 5 illustrates another example article 260. In this example, rather than the single panel 172, the article 260 includes a plurality of panels 272 that form portions of the suction side (SS) of the airfoil section 266. For example, the panels 272 are formed of ceramic, such as CMC or monolithic ceramic. The airfoil structure 272 includes a plurality of edges 272*a* that define bearing wedge portions 272*b* that have the bearing surfaces 80. The perimeter bearing surfaces 80 of the respective panels 272 contact the bearing surfaces 80 of the bearing wedge portions 272*b* in respective bearing interfaces (I).

Similar to the article 160, the airfoil structure 270 and the panels 272 compress the baffles (preloaded compliant members 174*b*). In this regard, the compliant response of the preloaded compliant members 174*b* to the applied load is to exert an opposite force. This opposite force provides a positive force through the spacers 92 on the panels 272, which is conveyed through the perimeter bearing surfaces 80 against the bearing surfaces 82 of the airfoil structure 270 to keep the panels 272 in the seated positions. In this example, the member 174*a* serves only as a seal and does not retain any of the panels 272.

Figure 6A:
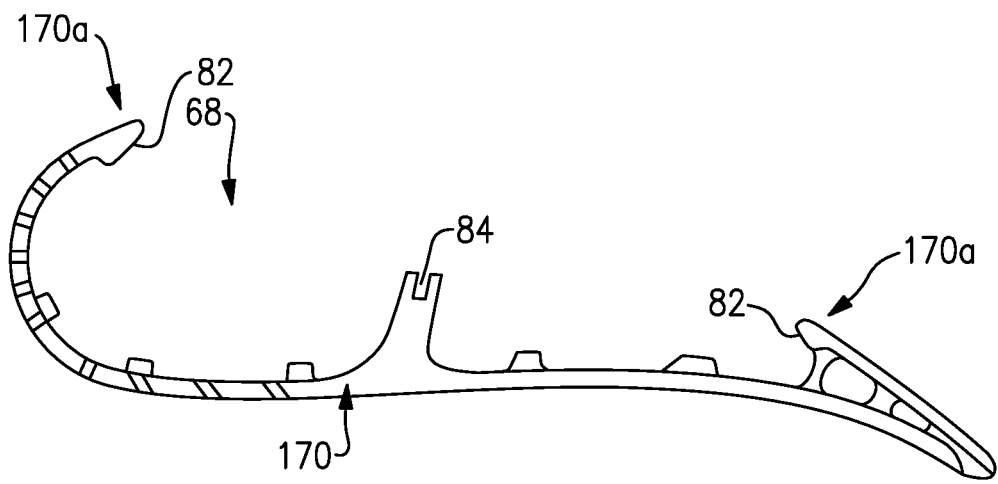
FIGS. 6A, 6B, 6C, and 6D depict a method of assembling an airfoil.
Figure 6B:
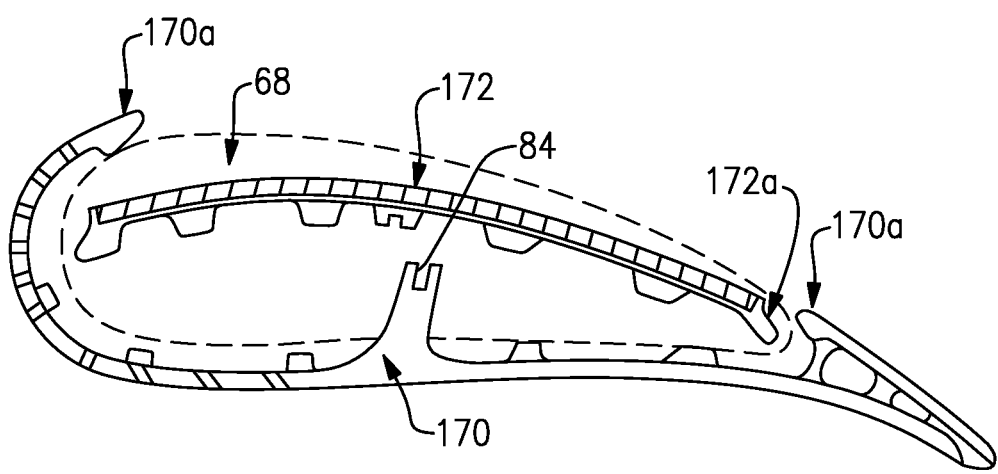
Figure 6C:
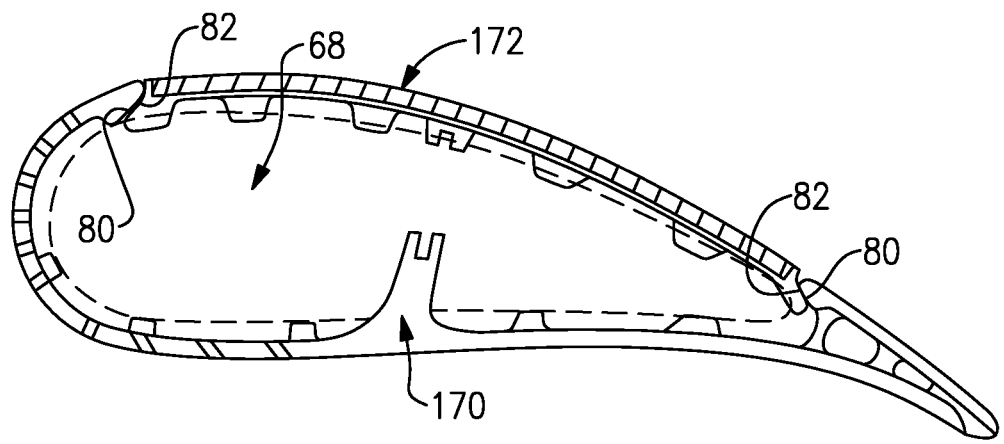
Figure 6D:
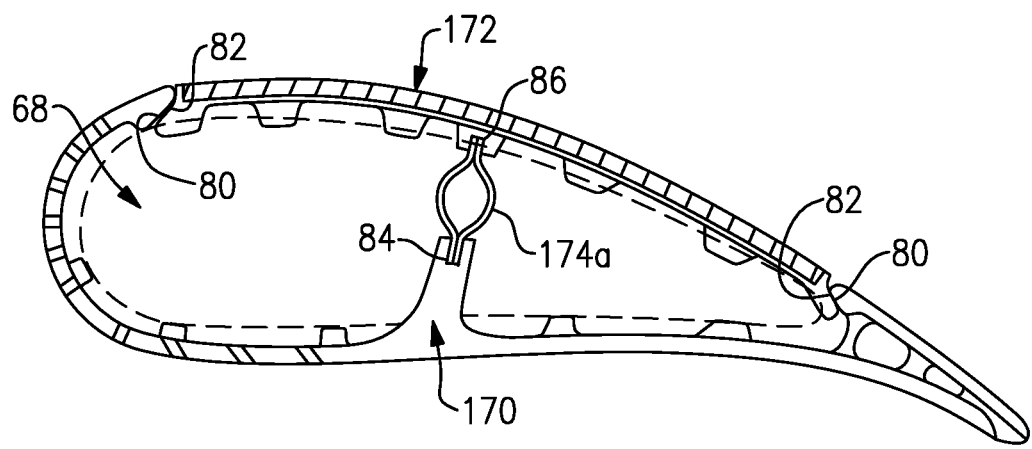
Figure 7:
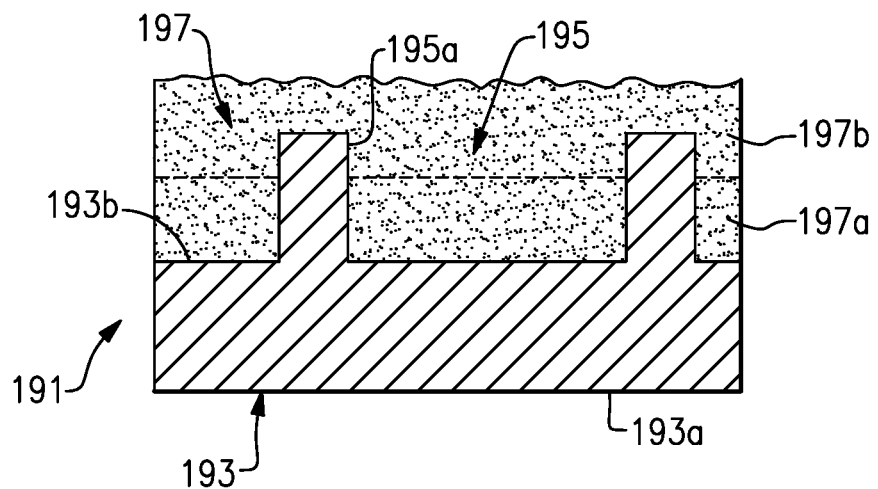
FIG. 7 illustrates a representative portion of a geometrically segmented coating section.

FIGS. 6A, 6B, 6C, and 6D depict a further example of the method of assembly. FIG. 6A depicts the airfoil structure 170 at the beginning of the method, without the panel 172 or preloaded compliant members 174*a*/174*b*. In FIG. 6B, the panel 172 is placed into the interior cavity 68. For instance, the panel 172 may be inserted into the interior cavity 68 through the opening between the edges 170*a* or through one of the radial ends of the airfoil structure 170. As shown in FIG. 6C, the panel 172 is then moved into the seated position, such that the bearing surfaces 80/82 are brought into contact, or at least into close proximity of each other. As depicted in FIG. 6D, the compliant member 174*a* is placed into the interior cavity 68 and preloaded by insertion into the slots 84/86. Insertion into the slots 84/86 may include deflecting (e.g., compressing) the compliant member 174*a*, placing it into the slots 84/86, and then releasing the compliant member 174*a*. Once released, since the space between the slots 84/86 is smaller than the size of the compliant member 174*a* in its at-rest position, the compliant member 174*a* is unable to spring back to its at-rest position, thereby preloading the compliant member 174*a*. The preloaded compliant members 174*b* may be assembled in a similar manner.

Should the panel 72/172/272 require replacement, the article 60/160/260 can be disassembled, the panel 72/172/272 can be replaced with a new one, and the article 60/160/260 can be reassembled. Accordingly, the panel 72/172/272 can be produced individually as a new article for original articles 60/160/260 or as an individual replacement article for an existing article or airfoil.

Figure 8:
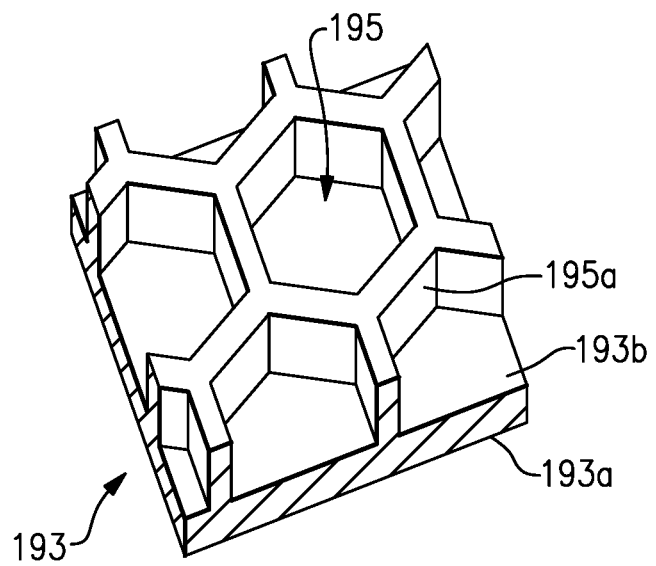
FIG. 8 illustrates an isolated view of a wall of the coating section of FIG. 6.

Additionally or alternatively, the airfoil structure 70/170/270, the panel 72/172/272, or both may include a geometric segmented coating section. For instance, FIG. 7 illustrates a representative geometric segmented coating section 191, which is also depicted in part in on the panel 172 (FIG. 3B). The coating section 191 includes a metal wall 193. The metal wall 193 includes a first or inner side 193*a* and a second or exterior side 193*b* that is opposite the first side 193*a*. The second side 193*b* is also the exterior side that faces toward the core gas path. The second side 193*b* includes an array of cells 195 defined by cell sidewalls 195*a*. The array is a repeating geometric pattern of one or more cell geometries. In this example, the cell sidewalls 195*a* have a uniform thickness. As shown in the isolated view of the wall 193 in FIG. 8, the cells 195 are hexagonal. Alternatively, the cells 195 may be circular, ovular, other polygonal geometry, or mixed cell geometries.

A coating 197 (FIG. 7) is disposed in the array of cells 195. The cells 195 mechanically facilitate bonding of the coating 197 on the wall 193. The cells 195 thus provide good bonding and spallation resistance of the coating 197, particularly at higher temperature locations. In turn, greater spallation resistance may reduce the need for bleed air for cooling or enable use of higher temperature bleed air that is less of an efficiency penalty. The coating 197 may be a barrier coating, such as a thermal barrier or environmental barrier, which is formed of a ceramic material. The coating 197 may be a monolayer coating but more typically will be a multi-layer coating. For instance, the coating 197 has a first coating layer 197*a* and a second coating layer 197*b*. In this example, the second coating layer 197*b* is a topcoat.

The ceramic material of the coating 197 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 197 may also include a bond coat for attaching the ceramic material to the wall 193 and cells 195. The wall 193 and cells 195 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 195a also facilitate reducing internal stresses in the coating 197 that may occur from sintering at relatively high surface temperatures during use in the engine 20. The sintering may result in partial melting, densification, and diffusional shrinkage of the coating 197 and thereby induce internal stresses. The cell sidewalls 195a serve to produce faults in at least the portion of the coating 197 above the cell sidewalls 195a. The faults provide locations for releasing energy associated with the internal stresses (e.g., reducing shear and radial stresses). That is, the energy associated with the internal stresses may be dissipated in the faults such that there is less energy available for causing delamination cracking between the coating 197 and the underlying wall 193.

The coating section 191 may be formed using several different fabrication techniques. As an example, the wall 193 may be fabricated by investment casting, additive manufacturing, brazing, or combinations thereof, but is not limited to such techniques. For instance, the cells 195 can be separately fabricated and brazed to the remaining portion of the wall 193, which can be investment cast or additively fabricated. Alternatively, the cells 195 can be formed by other techniques, such as depositing an alloy coating and removing sections of the alloy coating by machining, electro-discharge machining (EDM), or other removal process.

To produce the coating 197, ceramic coating material is deposited in the cells 195. The deposition process can include, but is not limited to, plasma spray or physical vapor deposition. In one example, plasma spray is used to produce a more durable version of the coating 197. For instance, the coating 197 has a laminar microstructure. The laminar microstructure includes grains of ceramic material that have a high aspect ratio. The laminar microstructure is a product of the plasma spray process, in which droplets of melted or partially melted ceramic material are sprayed onto the cells 195. Upon impact, the droplets flatten and solidify, yielding the laminar microstructure. There may be voids or pores among the grains; however, the coating 197 is substantially fully dense. For instance, the coating 197 has a porosity of less than 15%.

The ceramic coating material fills or substantially fills the cells 195 and is deposited in a thickness that is greater than the height of the cell sidewalls 195a. At this stage, the surface of the coating may have contours from the underlying cells 195. If such contours are undesired, the surface may be machined, ground, or abraded flat. For instance, the surface is reduced down to or close to the tops of the cell sidewalls 195a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil structure having an interior cavity;
   a preloaded compliant member in the interior cavity, wherein the preloaded compliant member includes a mechanical spring that is a rib seal that divides the interior cavity; and
   a panel defining a portion of an airfoil profile, the preloaded compliant member compliantly retaining the panel in a seated position on the airfoil structure.

2. The airfoil as recited in claim 1, wherein the panel includes a perimeter bearing surface and the airfoil structure includes a bearing surface, and in the seated position the perimeter bearing surface and the bearing surface of the airfoil structure are in contact in a bearing interface.

3. The airfoil as recited in claim 2, wherein the bearing interface is obliquely sloped with respect to a line that intersects the bearing interface and that is orthogonal to an exterior surface of the airfoil structure adjacent the bearing interface.

4. The airfoil as recited in claim 1, wherein the airfoil structure includes a first slot, the panel includes a second slot, and the first slot and the second slot retain the rib seal.

5. The airfoil as recited in claim 1, wherein the preloaded compliant member includes a mechanical spring and a baffle that is disposed in the interior cavity.

6. The airfoil as recited in claim 5, further comprising spacers between the baffle and the panel, the spacers separating the baffle from the panel such that there is a passage there between.

7. The airfoil as recited in claim 1, wherein the panel includes ceramic.

8. The airfoil as recited in claim 1, wherein the panel bounds a side of the interior cavity.

9. The airfoil as recited in claim 1, wherein the airfoil structure defines a different portion of the airfoil profile.

10. The airfoil as recited in claim 9, wherein the panel includes a perimeter bearing surface, the airfoil structure includes a bearing surface, in the seated position the perimeter bearing surface and the bearing surface of the airfoil structure are in contact in a bearing interface, and the bearing interface is obliquely sloped with respect to a line that intersects the bearing interface and that is orthogonal to an exterior surface of the airfoil structure adjacent the bearing interface.

11. A gas turbine engine comprising:
    a compressor section;
    a combustor in fluid communication with the compressor section; and
    a turbine section in fluid communication with the combustor,
    at least one of the turbine section or the compressor section including an airfoil having an airfoil structure including an interior cavity;
    a preloaded compliant member in the interior cavity, wherein the preloaded compliant member includes a mechanical spring that is a rib seal that divides the interior cavity; and
    a panel defining a portion of an airfoil profile, the preloaded compliant member compliantly retaining the panel in a seated position on the airfoil structure.

12. The gas turbine engine as recited in claim 11, wherein the panel includes a perimeter bearing surface, the airfoil structure includes a bearing surface, in the seated position the perimeter bearing surface and the bearing surface of the airfoil structure are in contact in a bearing interface, and the bearing interface is obliquely sloped with respect to a line that intersects the bearing interface and that is orthogonal to an exterior surface of the airfoil structure adjacent the bearing interface.

13. A method of assembling an airfoil, the method comprising:
   placing a panel into a seated position in an interior cavity of an airfoil structure; and
   placing a compliant member in the interior cavity and preloading the compliant member such that the preloaded compliant member compliantly retains the panel in the seated position, wherein the compliant member includes a mechanical spring that is a rib seal that divides the interior cavity.

14. The method as recited in claim 13, wherein the preloading includes deflecting the compliant member.

15. The method as recited in claim 13, wherein the panel includes a perimeter bearing surface and the airfoil structure includes a bearing surface, and placing the panel into the seated position includes moving the perimeter bearing surface into contact in a bearing interface with the bearing surface of the airfoil structure.

16. The method as recited in claim 15, wherein the bearing interface is obliquely sloped with respect to a line that intersects the bearing interface and that is orthogonal to an exterior surface of the airfoil structure adjacent the bearing interface.

17. A gas turbine engine article comprising:
   a support structure having an interior cavity and a bearing surface;
   a preloaded compliant member in the interior cavity; and
   a panel having a core gas path side and a perimeter bearing surface, and in a seated position of the panel on the support structure the preloaded compliant member compliantly retaining the perimeter bearing surface of the panel in contact against the bearing surface of the support structure in a bearing interface, wherein the preloaded compliant member includes a mechanical spring that is a rib seal that divides the interior cavity.

18. The article as recited in claim 17, wherein the bearing interface is obliquely sloped with respect to a line that intersects the bearing interface and that is orthogonal to an exterior surface of the support structure adjacent the bearing interface.

19. An airfoil comprising:
   an airfoil structure having an interior cavity;
   a preloaded compliant member in the interior cavity, wherein the preloaded compliant member includes a baffle;
   a panel defining a portion of an airfoil profile, the preloaded compliant member compliantly retaining the panel in a seated position on the airfoil structure; and
   spacers between the baffle and the panel, the spacers separating the baffle from the panel such that there is a passage there between.

20. The airfoil as recited in claim 19, further comprising another preloaded compliant member that includes a mechanical spring that is a rib seal that divides the interior cavity.

21. The airfoil as recited in claim 20, wherein the airfoil structure includes a first slot, the panel includes a second slot, and the first slot and the second slot retain the rib seal.

* * * * *